(12) United States Patent
Bittner

(10) Patent No.: US 8,579,720 B2
(45) Date of Patent: Nov. 12, 2013

(54) PUTTING STROKE TRAINING SYSTEM

(71) Applicant: Norman Douglas Bittner, St. Helena Island, SC (US)

(72) Inventor: Norman Douglas Bittner, St. Helena Island, SC (US)

( * ) Notice: Subject to any disclaimer, the term of this patent is extended or adjusted under 35 U.S.C. 154(b) by 0 days.

(21) Appl. No.: 13/680,833

(22) Filed: Nov. 19, 2012

(65) Prior Publication Data
US 2013/0079171 A1    Mar. 28, 2013

Related U.S. Application Data

(60) Continuation-in-part of application No. 13/404,387, filed on Feb. 24, 2012, now Pat. No. 8,337,321, which is a continuation-in-part of application No. 13/210,741, filed on Aug. 16, 2011, now Pat. No. 8,177,656, and a continuation-in-part of application No. 13/182,722, filed on Jul. 14, 2011, now Pat. No. 8,152,649, said application No. 13/182,722 is a division of application No. 12/268,231, filed on Nov. 10, 2008, now Pat. No. 8,002,643, said application No. 13/210,741 is a division of application No. 13/974,721, filed on Dec. 21, 2010, now Pat. No. 8,047,928, which is a continuation-in-part of application No. 12/268,231, filed on Nov. 10, 2008, now Pat. No. 8,002,643.

(60) Provisional application No. 61/652,499, filed on May 29, 2012, provisional application No. 61/449,112, filed on Mar. 4, 2011, provisional application No. 61/500,166, filed on Jun. 23, 2011, provisional application No. 61/524,079, filed on Aug. 16, 2011.

(51) Int. Cl.
*A63B 69/36*    (2006.01)

(52) U.S. Cl.
USPC .......................... 473/265; 473/226; 473/237

(58) Field of Classification Search
USPC .......... 473/219–226, 257, 278, 237, 265–268
See application file for complete search history.

(56) References Cited

U.S. PATENT DOCUMENTS

| | | |
|---|---|---|
| 2,090,348 A | 8/1937 | Ferry |
| 2,995,376 A | 9/1961 | Leo |
| 3,311,377 A | 3/1967 | Holbus |
| 3,687,459 A | 8/1972 | Swords |
| 3,885,796 A | 5/1975 | King |
| 3,945,646 A | 3/1976 | Hammond |
| 3,992,013 A | 11/1976 | Golden |
| 4,137,566 A | 1/1979 | Haas et al. |
| 4,155,555 A | 5/1979 | Fink |
| 4,251,077 A | 2/1981 | Pelz et al. |
| 4,254,956 A | 3/1981 | Rusnak |
| 4,304,406 A | 12/1981 | Cromarty |

(Continued)

OTHER PUBLICATIONS

U.S. Appl. No. 12/475,304, filed May 29, 2009.

*Primary Examiner* — Nini Legesse
(74) *Attorney, Agent, or Firm* — Nixon & Vanderhye P.C.

(57) ABSTRACT

A putting stroke training system identifies a preferred putting stroke and facilitates training for a golfer to repeat the preferred putting stroke. The training system includes a grid box with a fixed side wall and a movable side wall. The movable side wall is positionable relative to the fixed side wall into alignment with the preferred putting stroke. The training system also includes an alignment sensor attachable to a putter head. In some embodiments, the alignment sensor signals when the putter head deviates from the preferred stroke.

14 Claims, 11 Drawing Sheets

(56) References Cited

U.S. PATENT DOCUMENTS

| | | | | |
|---|---|---|---|---|
| 4,341,384 A | | 7/1982 | Thackrey | |
| 4,526,373 A | * | 7/1985 | Medlock | 473/265 |
| 4,535,992 A | | 8/1985 | Slagle | |
| 4,615,526 A | | 10/1986 | Yasuda et al. | |
| 4,858,934 A | | 8/1989 | Ladick et al. | |
| 4,958,836 A | | 9/1990 | Onozuka et al. | |
| 4,962,931 A | | 10/1990 | Jazdzyk, Jr. | |
| 4,971,325 A | | 11/1990 | Lipps | |
| 4,979,745 A | | 12/1990 | Kobayashi | |
| 5,020,802 A | | 6/1991 | af Strom | |
| 5,282,627 A | | 2/1994 | Beck | |
| 5,374,063 A | * | 12/1994 | Ogden | 473/220 |
| 5,393,065 A | * | 2/1995 | LeQuyea | 473/260 |
| 5,419,562 A | | 5/1995 | Cromarty | |
| 5,435,547 A | | 7/1995 | Lee | |
| 5,492,329 A | | 2/1996 | Kronin | |
| 5,501,463 A | | 3/1996 | Gobush et al. | |
| 5,614,823 A | | 3/1997 | Katayama et al. | |
| 5,638,300 A | | 6/1997 | Johnson | |
| 5,685,782 A | | 11/1997 | Lipps et al. | |
| 5,907,819 A | | 5/1999 | Johnson | |
| 6,027,417 A | | 2/2000 | Zoretic et al. | |
| 6,095,928 A | | 8/2000 | Goszyk | |
| 6,287,215 B1 | | 9/2001 | Fisher | |
| 6,361,449 B1 | | 3/2002 | Holly | |
| 6,375,579 B1 | | 4/2002 | Hart | |
| 6,443,852 B1 | * | 9/2002 | Kim | 473/265 |
| 6,669,574 B1 | * | 12/2003 | Riley et al. | 473/264 |
| 6,739,981 B1 | | 5/2004 | Lin | |
| 6,849,001 B2 | | 2/2005 | Simpson | |
| 6,875,120 B1 | | 4/2005 | Ellis | |
| 6,913,544 B2 | | 7/2005 | Tiffin | |
| 7,232,375 B1 | | 6/2007 | Robert et al. | |
| 7,824,276 B2 | | 11/2010 | Simpson | |
| 7,955,180 B2 | | 6/2011 | Bittner | |
| 8,002,643 B2 | | 8/2011 | Bittner | |
| 8,047,928 B2 | | 11/2011 | Bittner | |
| 8,152,649 B2 | | 4/2012 | Bittner | |
| 8,177,656 B2 | | 5/2012 | Bittner | |
| 8,257,191 B2 | | 9/2012 | Stites et al. | |
| 2001/0005695 A1 | | 6/2001 | Lee et al. | |
| 2002/0077189 A1 | | 6/2002 | Tuer et al. | |
| 2004/0014531 A1 | | 1/2004 | Ziener-Gundersen | |
| 2004/0106092 A1 | * | 6/2004 | Galanis et al. | 434/252 |
| 2005/0197198 A1 | | 9/2005 | Otten et al. | |
| 2005/0202893 A1 | * | 9/2005 | Otten et al. | 473/219 |
| 2005/0261073 A1 | | 11/2005 | Farrington et al. | |
| 2006/0029916 A1 | | 2/2006 | Boscha | |
| 2007/0249428 A1 | | 10/2007 | Pendleton et al. | |
| 2008/0242437 A1 | | 10/2008 | Taylor | |
| 2009/0163285 A1 | | 6/2009 | Kwon et al. | |
| 2011/0086720 A1 | | 4/2011 | Jaekel et al. | |
| 2012/0289354 A1 | | 11/2012 | Cottam et al. | |
| 2012/0322569 A1 | | 12/2012 | Cottam | |
| 2012/0329568 A1 | | 12/2012 | Stites et al. | |

* cited by examiner

PUTTING STROKE TRAINING SYSTEM

CROSS-REFERENCES TO RELATED APPLICATIONS

This application is a continuation-in-part (CIP) of U.S. patent application Ser. No. 13/404,387, filed Feb. 24, 2012, pending, and claims the benefit of U.S. Provisional Patent Application No. 61/652,499, filed May 29, 2012, the entire contents of each of which are herein incorporated by reference.

U.S. patent application Ser. No. 13/404,387 claims the benefit of U.S. Provisional Patent Application No. 61/449,112, filed Mar. 4, 2011, U.S. Provisional Patent Application No. 61/500,166, filed Jun. 23, 2011, and U.S. Provisional Patent Application No. 61/524,079, filed Aug. 16, 2011, the entire contents of each of which are herein incorporated by reference.

U.S. patent application Ser. No. 13/404,387 is also a continuation-in-part (CIP) of U.S. patent application Ser. No. 13/182,722, filed Jul. 14, 2011, now U.S. Pat. No. 8,152,649, and a continuation-in-part (CIP) of U.S. patent application Ser. No. 13/210,741, filed Aug. 16, 2011, now U.S. Pat. No. 8,177,656, the entire contents of each of which are hereby incorporated by reference in this application.

U.S. patent application Ser. No. 13/182,722 is a divisional of U.S. patent application Ser. No. 12/268,231, filed Nov. 10, 2008, now U.S. Pat. No. 8,002,643, the entire contents of which are hereby incorporated by reference in this application.

U.S. patent application Ser. No. 13/210,741 is a divisional of U.S. patent application Ser. No. 12/974,721, filed Dec. 21, 2010, now U.S. Pat. No. 8,047,928; which is a continuation-in-part of U.S. patent application Ser. No. 12/268,231, filed Nov. 10, 2008, now U.S. Pat. No. 8,002,643, the entire contents of each of which are hereby incorporated by reference in this application.

STATEMENT REGARDING FEDERALLY SPONSORED RESEARCH OR DEVELOPMENT (NOT APPLICABLE)

BACKGROUND OF THE INVENTION

The invention relates generally to a device and method for training and analysis of a putting stroke and, more particularly, to a putting stroke training system that identifies a preferred putting stroke and facilitates training for a golfer to repeat the preferred putting stroke.

For a golfer to be a good putter, the golfer must be able to control distance and direction with a putter. The golfer must also possess skills for "reading" a green. When "reading" a green, the golfer analyzes the terrain between the ball and the hole and determines the extent to which the ball will curve or "break" during the putt.

Golfers typically putt with a pendulum type swing using a shoulder turn. Other putting styles are also used, sometimes depending on the type and/or size of the putter. Regardless of the particular style used, it is critical to a successful putter that the golfer be capable of making a consistent stroke.

Training devices exist that purport to help golfers in achieving a consistent putting stroke. U.S. Published Patent Application No. 2006/0029916 A1 (Boscha) discloses a golf putter for training a golfer, where the golf putter has a handle, a head, and sensing unit for sensing parameters. U.S. Published Patent Application No. 2007/0249428 A1 (Pendleton, et al.) discloses a putting training device comprising a surface over which a golfer executes a putting stroke, an electric field generator, an electric field detector, and a plurality of electrodes responsive to the electric field generator each for producing an electric field. As the golfer executes the putting stroke, one or more of the electric fields is perturbed, and the electric field detector detects the perturbed electric field to determine parameters related to putter head movement. U.S. Pat. No. 6,375,579 B1 (Hart) discloses a dynamic laser based golf swing analysis system having single and multiple laser sources that broadcast a monochromatic laser light projected through a cylindrical lens system to generate a series of light planes in space. None of these prior devices adequately illustrates a putting stroke path to assist a golfer in making consistent and accurate putting strokes.

BRIEF SUMMARY OF THE INVENTION

Research has pointed out a fundamental misunderstanding of how a golfer should go about practicing putting. What has been happening traditionally is that a golfer repeatedly practices a putting stroke aiming at a cup, for example, some distance away. Some balls go in but most just miss by a small margin. The golfer does not know why. There is no benchmark or record. This is known in science as random behavior producing results from some unknown origin.

It is possible in present versions of software and touch screen technology to trace on a computer screen the path of a putting stroke. The putting motion must be consistent to ensure predictability of the putt. It does not matter to the golf ball if it has been stroked with a pendulum swing or a linear path motion. It is the replication of a grooved stroke that is important to produce contact with the ball consistently. The system of the described embodiments identifies a preferred putting stroke and facilitates training for a golfer to repeat the preferred putting stroke.

In an exemplary embodiment, a putting stroke training system includes a putting surface with a stroke recording section and a result section. The stroke recording section records stroke paths of a putter head, and the result section records a result of each stroke of the putter head and identifies successful strokes. A stroke analysis tool cooperable with the putting surface correlates successful strokes with respective ones of the stroke paths recorded by the stroke recording section. The stroke analysis tool generates a preferred stroke path based on the respective ones of the stroke paths correlated with the successful strokes. An alignment tool includes a putting guide that graphically illustrates the preferred stroke. The alignment tool includes a fixed side wall and a movable side wall, where the movable side wall is positionable relative to the fixed side wall into alignment with the preferred stroke.

The preferred stroke path may include a backswing path and a follow-through path, where the movable side wall is positionable into alignment with the backswing path of the preferred stroke.

In one arrangement, the putting surface is a bottom wall of the alignment tool. Alternatively, the putting surface may be a putting board.

The movable side wall may be formed of a flexible material and may be connected to the fixed side wall with a plurality of set screws. In this arrangement, the set screws are adjustable to position the movable side wall into alignment with the preferred stroke.

The system may additionally includes an alignment sensor attachable to a putter head. In this context, the putting guide may include a line representative of the preferred stroke, where the alignment sensor detects a position of the putter head relative to the line. The alignment sensor may include a signal source that emits a signal depending on the position of the putter head relative to the line. In one arrangement, the alignment sensor includes two guide points or lines on a visible surface, where the putting guide comprises two lines representative of the preferred stroke. The two lines are spaced apart by a distance that equals a distance between the two guide points or lines on the visible surface of the alignment sensor. The alignment sensor may include two optical sensors that detect the position of the putter head relative to the two lines of the putting guide, where the signal source of the alignment sensor emits a separate signal for each of the two optical sensors relative to the two lines of the putting guide.

Preferably, the stroke analysis tool generates the preferred stroke path based on an average of a plurality of the stroke paths correlated with the successful strokes. The stroke recording section may include an electronic recording screen having one of a touch sensitive or light sensitive surface, where the electronic recording screen is coupled with a memory that stores the putter head stroke paths based on signals from the electronic recording screen. Still further, the stroke analysis tool may include a computer processor communicating with the electronic recording screen and the result section, where the computer processor selectively displays the preferred stroke on the electronic recording screen.

In another exemplary embodiment, a grid box for training a golfer to putt along a preferred putting stroke includes a fixed side wall, and a movable side wall, where the movable side wall is positionable relative to the fixed side wall into alignment with the preferred putting stroke. The bottom wall may be formed of a transparent material.

In yet another exemplary embodiment, a putting stroke training system for training a golfer to putt along a preferred putting stroke includes a grid box including a fixed side wall and a movable side wall, where the movable side wall is positionable relative to the fixed side wall into alignment with the preferred putting stroke, and an alignment sensor attachable to a putter head.

BRIEF DESCRIPTION OF THE DRAWINGS

These and other aspects and advantages will be described in detail with reference to the accompanying drawings, in which.

DETAILED DESCRIPTION OF THE INVENTION

Figure 1:
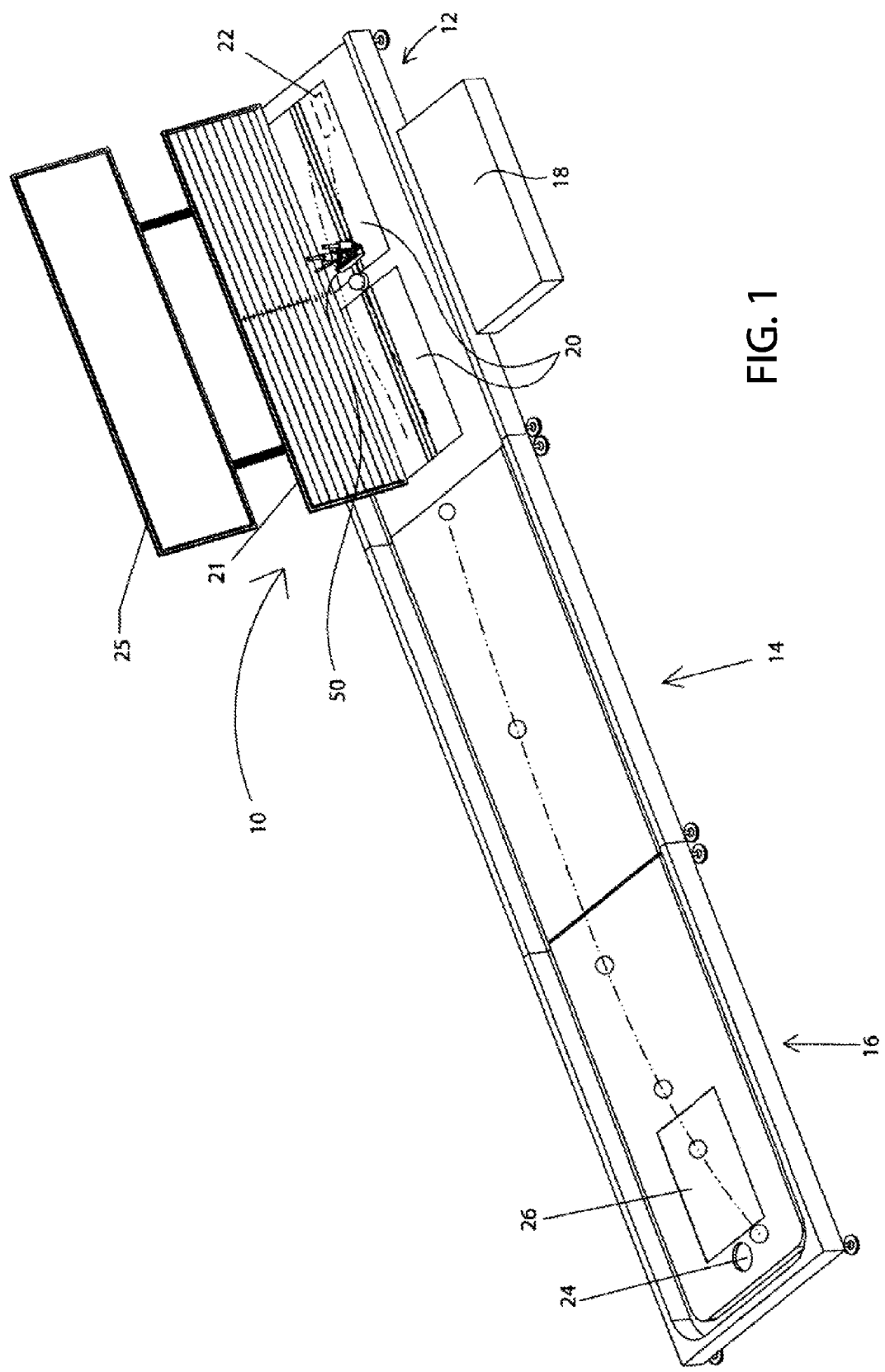
FIG. 1 is a perspective view of the putting stroke training system.

FIG. 1 is a perspective view showing the components of the putting stroke training system. The system includes a putting board 10 having a stroke recording section 12, a middle section 14 and a result section 16. The middle section 14 can be removed for simulating shorter putts, or additional middle sections may be added to extend the length of the putting board 10. In preferred embodiments, the putting board 10 can provide for putt lengths from 6-30 feet. A golfer stands on a platform 18 adjacent the putting board 10 during training and analysis. The platform 18 can be moved to either side to accommodate left-hand and right-hand swinging golfers.

The stroke recording section 12 serves to record stroke paths of a putter head 50. In a preferred construction, the stroke recording section 12 includes one or more electronic recording screens 20 embedded in the floor of the putting board. The electronic recording screens 20 may include one of a touch sensitive or light sensitive surface. The screens 20 serve to record the path of the putter head 50 as it is drawn back and through the ball and may also record the path of the ball after being struck by the putter head 50. The technology for the electronic recording screens 20 is known, and additional details of their structure and operation will not be further described. An exemplary recording screen is available from Perceptive Pixel of New York, N.Y. (www.perceptivepixel.com).

The stroke recording section 12 may additionally include a signal receiver 21 preferably in the form of a screen or the like that is disposed facing the golfer during a putting stroke. The signal receiver 21 is cooperable with an attachment to the putter head (discussed in more detail below) to measure a vertical position of the putter head 50 during the putting stroke.

The electronic recording screen(s) 20 include or communicate with a memory 22 that digitally stores the putter head stroke paths based on signals from the electronic recording screen(s) 20.

The result section 16 records a result each stroke of the putter head 50 and identifies successful strokes. In one embodiment, the results section 16 includes an opening 24 in a surface of the putting board 10 that simulates a golf hole in a putting green. A sensor detects a ball in the opening. The result section 16 may also include an electronic board 26 that detects dynamic characteristics of a golf ball rolling over the electronic board 26. As shown in FIG. 1, the electronic board 26 in the results section 18 may be positioned in front of the opening 24 in the putting board surface. The putting board may also include a display screen 25 that can show a stroke path based on measurements from the recording screen(s) 20, or a comparison of a stroke path to a desired path, or video analysis based on characteristics of a detected stroke path, or multimedia instruction, etc.

Figure 5:
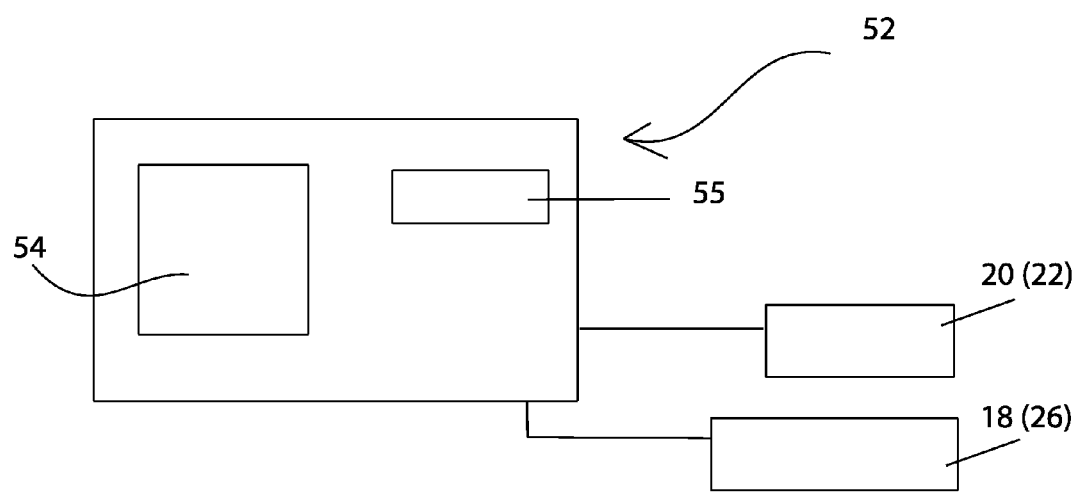
FIG. 5 is a schematic block diagram of the stroke analysis tool.

The system may additionally include a stroke analysis tool 52 (FIG. 5) that correlates successful strokes with respective ones of the stroke paths recorded by the stroke recording section 12. The stroke analysis tool 52 generates a preferred stroke path based on the respective ones of the stroke paths correlated with the successful strokes. In one embodiment, the stroke analysis tool 52 generates the preferred stroke path based on an average of a plurality of the stroke paths correlated with the successful strokes. In a preferred construction, with reference to FIG. 5, the stroke analysis tool 52 includes a computer processor 54 and memory 55 that communicate with the electronic recording screens 20, 26 and the results section 16. The computer processor 54 selectively displays the preferred stroke on the electronic recording screen(s) 20.

Figure 3:
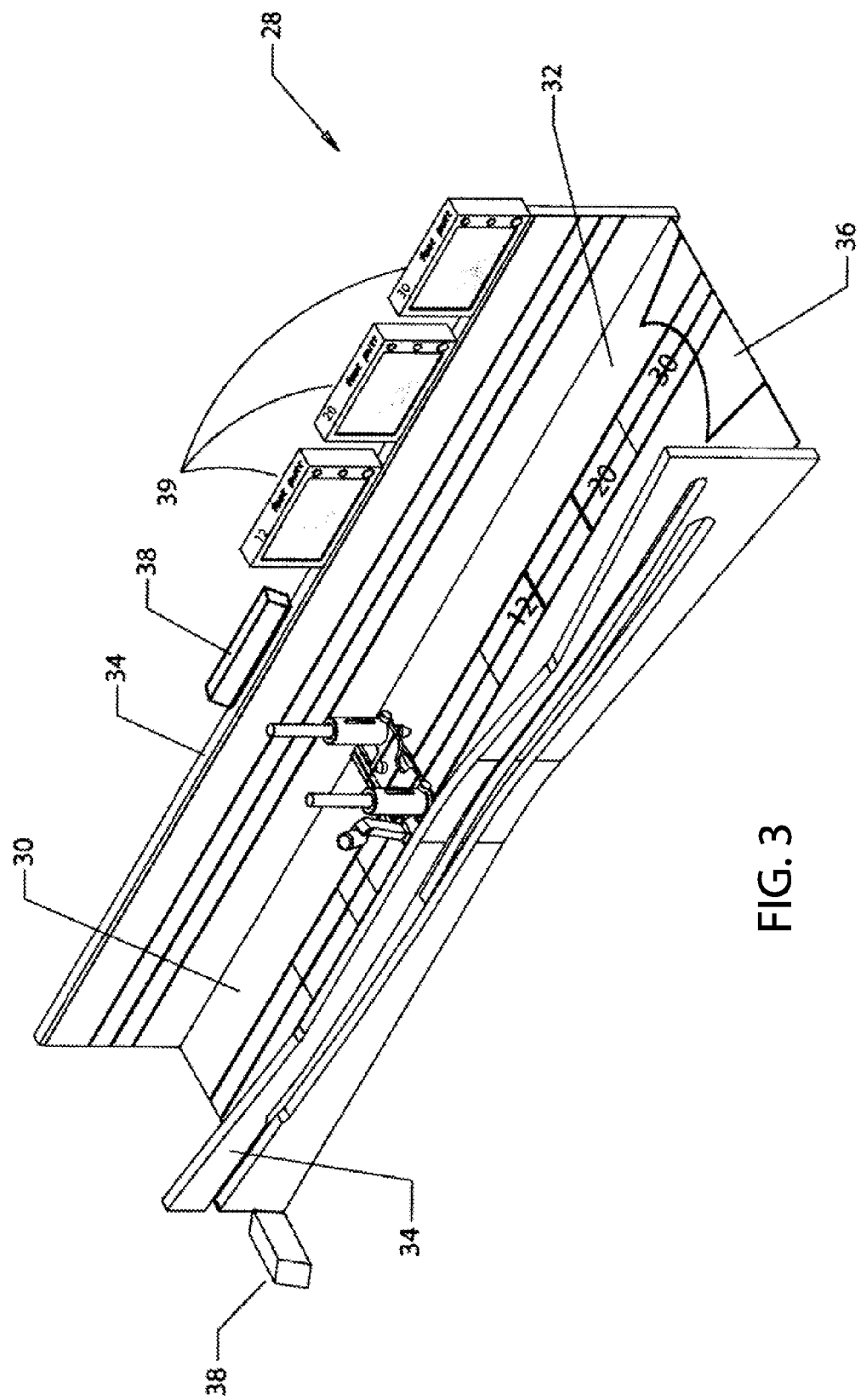
FIG. 3 shows an alignment tool in the form of a grid box that is cooperable with the putting board.

With reference to FIG. 3, the putting stroke training system may additionally include an alignment tool such as grid box 28 that includes putting guide insert 30 that graphically illustrates the preferred stroke. The putting guide insert 30 is printed based on data measured by the stroke analysis tool 52. As such, the printed putting guide insert 30 is customized for each golfer based on each golfer's unique stroke. The alignment tool or grid box 28 is portable and independent from the putting board 10. The grid box 28 includes a bottom 32 and two sides 34 as shown, and the putting guide insert 30 is positioned inside the grid box 28 on the bottom 32. The bottom 32 may be made of a clear material such as acrylic or plexiglass or the like so that with the grid box 28 on the putting board 10, the preferred stroke can be displayed on the electronic recording screen(s) 20 and viewed through the bottom 32 of the grid box 28. Also, when practicing on a real putting surface, the see-through bottom 32 will enable the golfer to better visualize the surface texture, color, etc. for more effective practice.

Preferably, the grid box 28 includes a protractor 36 at the putting end. The protractor 36 may be attached in the opposite orientation. Additionally, the grid box 28 may include one or both of a side-to-side level and a front-to-back level 38, which show an orientation of the grid box 28 on the green.

The levels 38 can be analog or digital, and a single level could be used to measure an orientation of the grid box in two dimensions. An analog level could also be put on a swivel so it can record both longitudinal and side-to-side inclinations of the putting green. The positions of the two readings can be related to the protractor 36. It may read, for example, 4° downward slope and 2° side hill slope. An index can be established that will determine the compensation in aiming the grid box 28. The index is representative of a variation in degrees from the norm of a straight putt on a flat surface. The resulting arithmetical reading on the protractor can indicate how much the grid box 28 should be repositioned in aim to compensate for the trajectory that the ball is going to have to travel in its path to the cup. Measurements of this type can lead to training a golfer to read greens with a higher percentage of accuracy.

The grid box 28 may still also include one or more metronomes 39, which provide an audible and visual rhythm for the putting stroke. As shown in FIG. 3, the grid box 28 may be provided with three metronomes 39 with specific settings for putt lengths of 12, 20 and 30 feet, respectively. The metronomes 39 are preferably used in concert with drawback lines 40 included as part of the putting guide insert 30 in the grid box 28 (see FIG. 6). As shown, putting guide insert may also include guide lines 42 to facilitate putter head alignment using corresponding lines 44 on the putter head 50.

Figure 4:
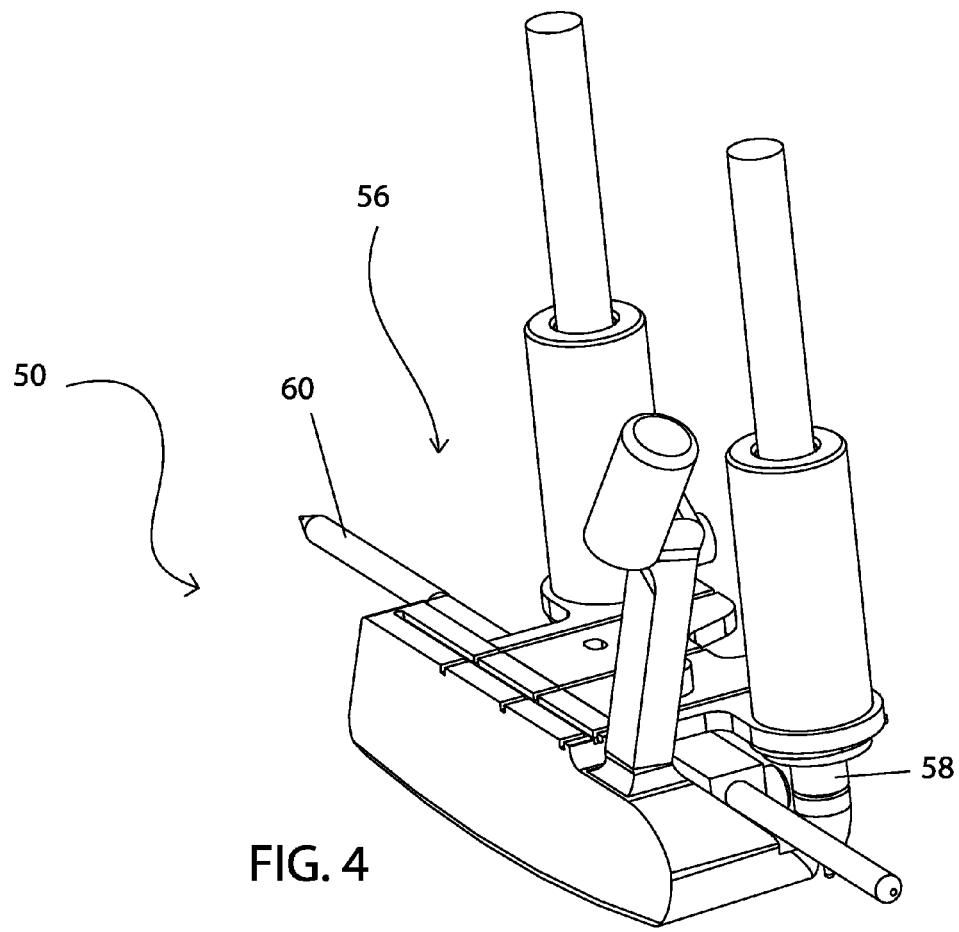
FIG. 4 is a perspective view of a putter head including a scriber attachment.

FIG. 4 is a perspective view of the putter head 50. The putter head 50 is fitted with a scriber attachment 56 including one or more marking members 58 that are detectable by the electronic recording screen(s) 20. The scriber attachment 56 also includes a signal emitter 60 that is oriented in a direction substantially parallel to a surface of the putting board 10 as shown. With continued reference to FIGS. 1 and 2, the signal receiver 21 is disposed facing the signal emitter 60 during a putting stroke. In a preferred construction, the signal receiver 21 comprises a light sensitive electronic screen, and the signal emitter 60 emits a signal that is detectable by the light sensitive electronic screen. The signal emitter 60 and the signal receiver 21 are positioned to record the vertical position of the putter head 50 during the putting stroke.

With the system assembled, a golfer begins training by standing on the platform 18 and making initial putts to familiarize the golfer with the system architecture. After the golfer is comfortable with putting directions, the recordings can begin for diagnostic purposes. Each putting motion is scribed on the board 10 and generated into a pattern that the stroke analysis tool 52 can synthesize into a mean or average motion relative to the success of the putts. Because the opening/hole 24 is able to record a successful putt, there can be a correlation between the putting pathway and the successful putt. Missed putts along with their putting pathways and attempts can be discarded. The number of successful putts is recorded and correlated with pathways generated by the putting stroke. At the end of testing, the stroke analysis tool 52 shows a line or an average of several lines that have been followed by the golfer's club that has produced the most successful number of putts. The scriber 56 records the putting pathway on the screen(s) 20. The stroke analysis tool 52 correlates the putter inscriptions with the number of successful putts recorded on the screen(s) 20. The software may be capable of predicting a successful putt by interpretations of inscribed pathways left on the electronic recording screen(s) 20.

Figure 2:
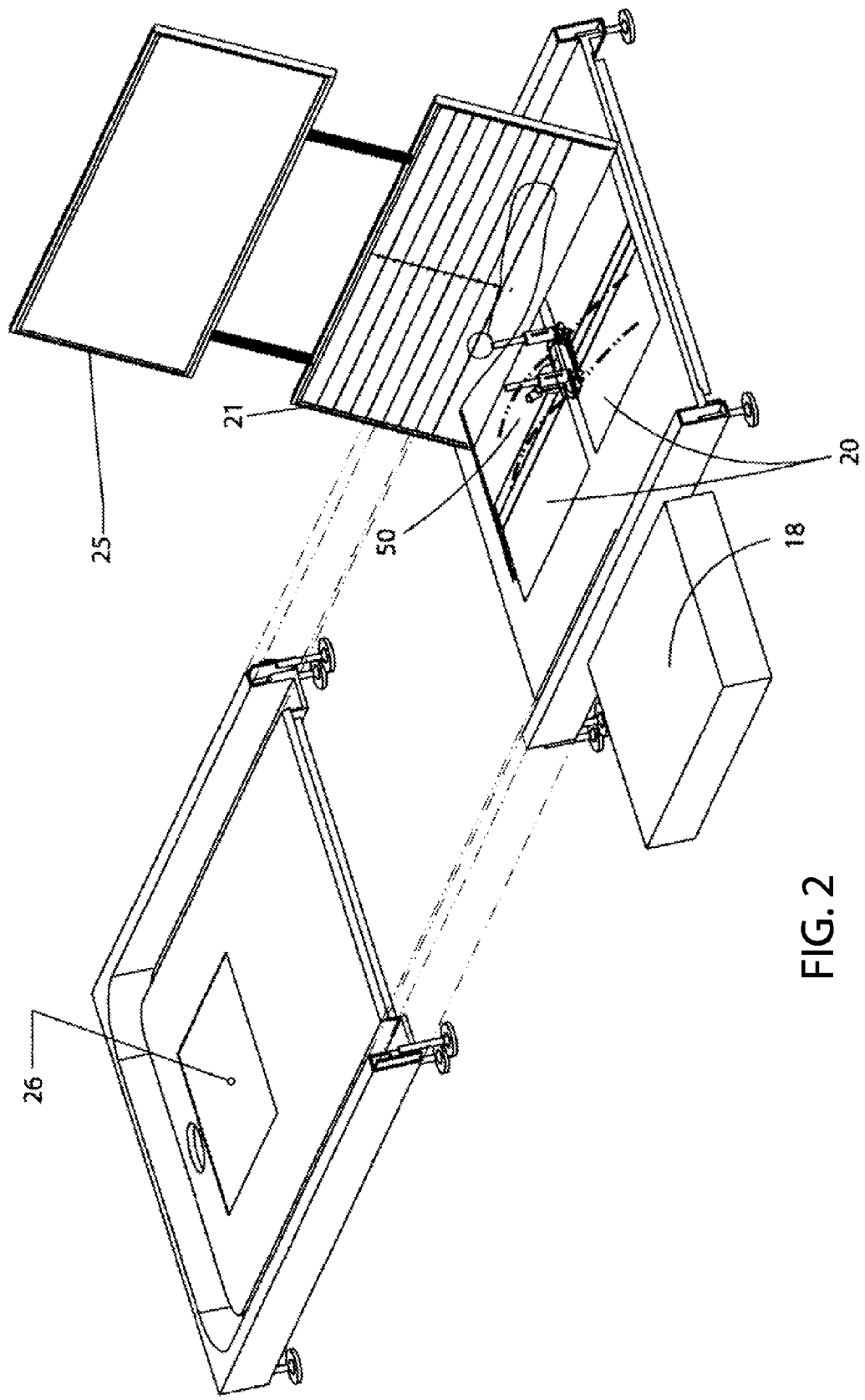
FIG. 2 shows the stroke recording section of the putting board.
Figure 7:
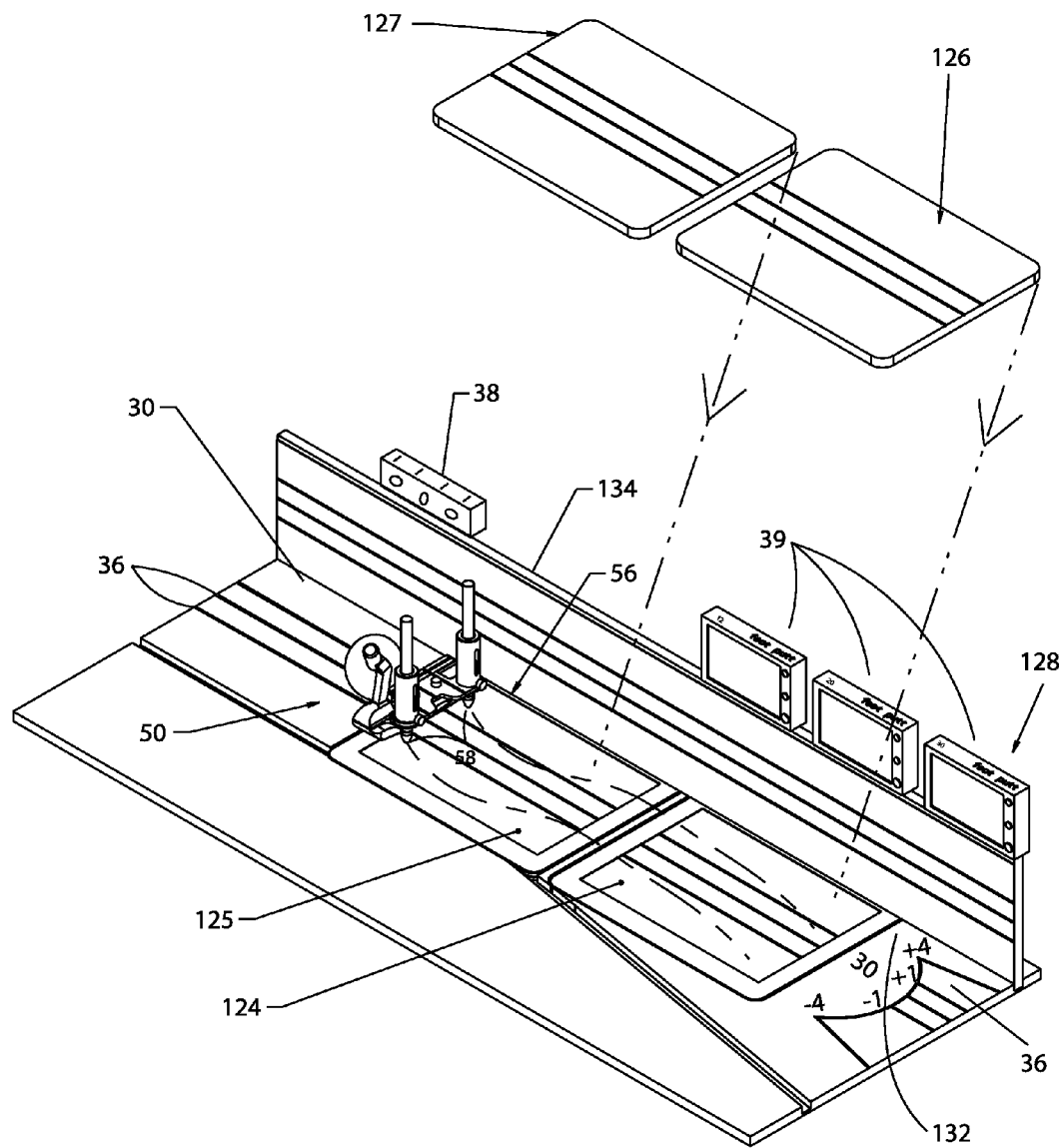
FIG. 7 is a perspective view of an alternative grid box.

As an alternative to the putting board 10 shown in FIGS. 1 and 2, with reference to FIG. 7, the training and practice tool may be assembled in the form of a modified grid box 128, which is portable and easily positioned for use by a golfer. The grid box 128 includes a bottom 132 and at least one side 134 as shown. Openings or blanks are provided in the bottom 132 to accommodate one and preferably two computers 124, 125 (such as an iPad available from Apple, Inc., or other tablet computer, or screen technology available from Perceptive Pixel—www.perceptivepixel.com). The computers 124, 125 are positioned in the blanks such that a top surface of the computers is flush and continuous with the surface of the bottom 132 facing the golfer. The system also includes inserts 126, 127 that match the profile of the computers 124, 125 in the event that the golfer elects to use the grid box 128 without the computers 124, 125. The modified grid box 128 and computers 124, 125 function similar to the putting board described above to determine a preferred putting stroke or ideal stroke pathway. The pathway is entirely customized for each golfer and may have a great degree of variability according to the golfer's height, weight, previously-established putting habits, etc. Included in the preferred putting path determination are measurements for the distance of the drawback for various length putts. Hash marks for these distances may be marked on one of the computer screens. Through the initial training process, it will be determined, possibly with the assistance of a professional teacher, the various distances of drawback of the club relative to the distance the ball is to be putt to the cup. Also included may be measurements of time and rhythm of the putting stroke.

When the preferred pathway for the successful putt has been determined, preferably based on an average pathway of successful putts, the preferred pathway is printed on an insert 30 for the grid box 28 or displayed on the electronic recording screens 20 of the putting board 10 or on the computers 124, 125 of the modified grid box 128. One or both of the inserts 126, 127 are also provided with the preferred pathway. These inserts 126, 127 may be formed of a transparent material such as acrylic or plexiglass or the like, preferably ⅛ inch thickness, and can be used on a putting green independent of the grid box 28, 128.

Figure 8:
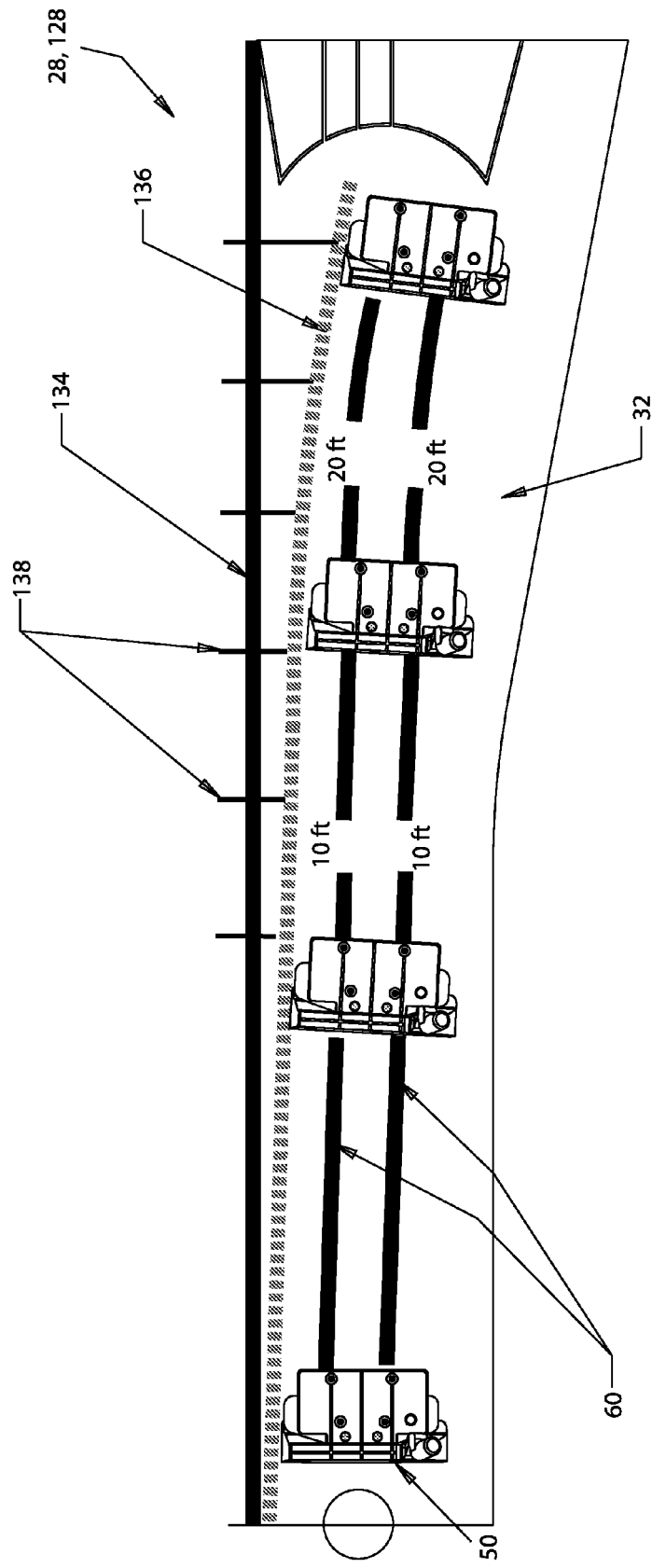
FIG. 8 shows a grid box including a moveable inner wall.

With reference to FIG. 8, in addition to the fixed side wall 134, the grid box 28, 128 may additionally include a movable side wall 136 that is positionable relative to the fixed side wall 134 into alignment with the preferred putting stroke. The movable side wall 136 is preferably formed of a flexible material such as rubber, balsa wood, a composite, or other suitable flexible material. The movable side wall 136 is connected to the fixed side wall 134 with a plurality of set screws 138. The set screws 138 are adjustable to position the movable side wall 136 into alignment with the preferred stroke. As shown, it is intended for a toe of the putter head 50 to be guided by the movable side wall 136, and the movable side wall 136 is thus positioned so that it is parallel with the graphical illustration of the preferred putting stroke. Once the golfer masters the preferred putting stroke or adequately affixes the preferred putting stroke in muscle memory, the movable wall 136 can be moved to a position adjacent the fixed wall 134 and out of the way by adjusting the set screws 138.

Repeatedly, the golfer executes putting attempts. The surface of the bottom 32 that is facing the golfer is thus inscribed with guidelines that show the golfer the preferred putting path. The printed lines guide the golfer to follow the lines with guide lines on the putter head 50 repeatedly until muscle memory is accomplished. During the phase using the screen 20 for guidance, there is once again a correlation between the recordings of successful putts with their pathways. During the training phase, it is especially desirable for the golfer to train his eye and muscle memory to follow the lines on the grid insert 30. For a beginning golfer or a golfer that struggles with putting and is looking to try a new stroke, the system may generate a suggested stroke pathway on the recording screen 20.

Figure 6:
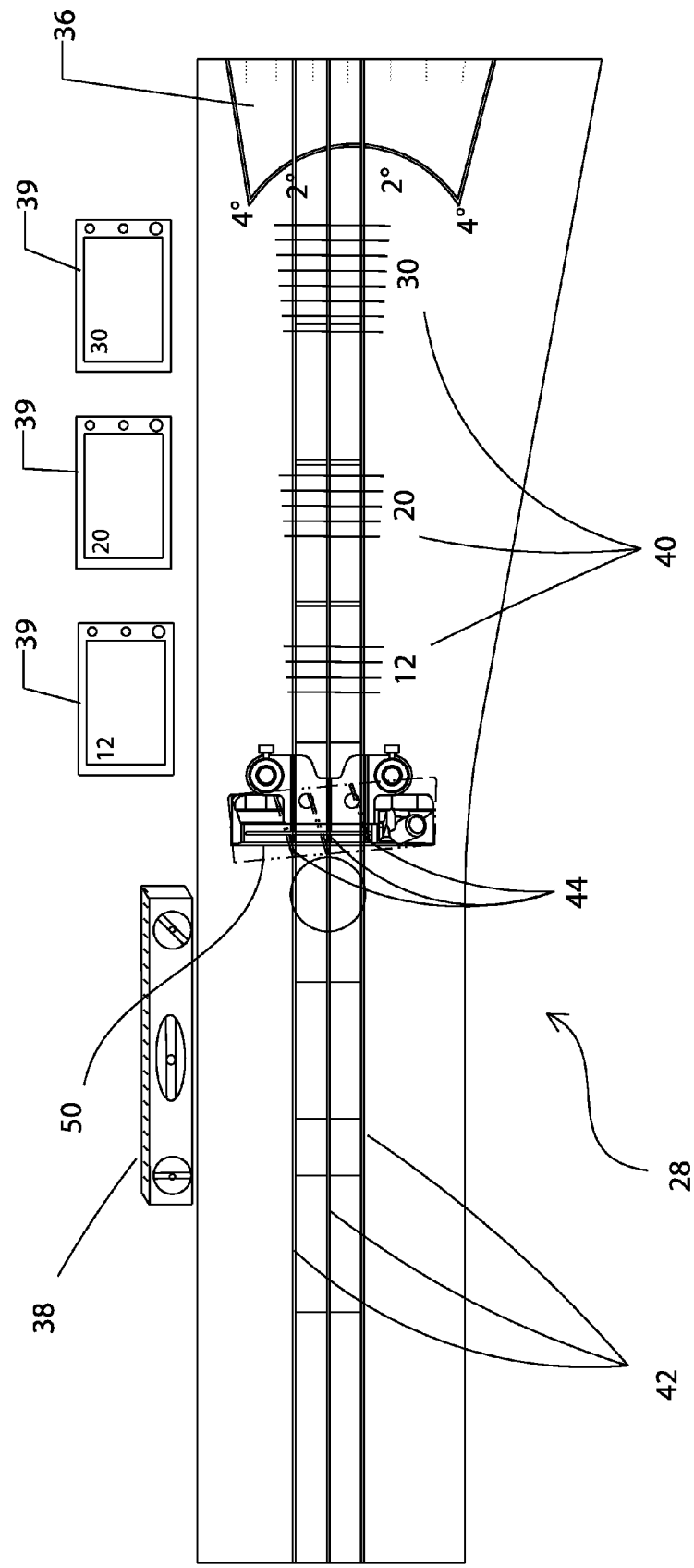
FIG. 6 shows additional details of the alignment tool.

The golfer continues to putt repeatedly trying to make any necessary corrections if the putter head 50 is wavering off the grid lines on the insert 30 that correspond to the preferred putting pathway. With reference to FIG. 6, regardless of the preferred putting pathway, an accurate putt requires that the face of the putter head 50 is perpendicular to the desired ball path at impact. The system can detect when the putter head is not perpendicular at impact (see dashed line putter head in FIG. 6) and provide an appropriate alert to the golfer (e.g., via sensor strips 60 and an alignment sensor 70 discussed in more detail below). At this point, all strokes and attempts have been directed toward the opening/cup 24 on the typical length putting board 10, e.g., 12 feet. At a later time in training, when using the grid box 28, 128 various new distances for putts can be memorized. After the ideal patterns for various putts are printed, a printout for the insert 30 is selected and placed or displayed in the grid box 28, 128.

The grid box 28, 128 has become an important component of transference of knowledge from the computer diagnosis to the take home grid box. The printout guide insert 30 can be replaced on the floor 32 of the grid box 28 after subsequent putting lessons if there are serious changes required for improved putting. The grid box 28, 128 is coordinated with diagnostics from the stroke analysis tool 52 preferred putting pathway and is important to the procedure because it has the golfer take home results for training and practice in the golfers' grid box 28, 128. Every student can utilize a grid box 28, 128 with a unique printout insert 30, and as putting improves and the player is retested, and a new printout insert 30 can be provided. Additionally, there are numerous printout inserts 30 for different putt lengths. As noted, the preferred putting pathway can also be provided on the grid box inserts 126, 127.

As shown in FIG. 8, sensor strips 60 may be secured to the bottom surface 32 (or alternatively to the computers 124, 125 or the inserts 126, 127) in alignment with the preferred putting stroke. Corresponding "strips" may alternatively be displayed as part of the displayed or printed graphical illustration. The sensor strips 60 may be formed of any suitable construction including, for example, a metallic tape or reflective tape or the like. In the graphical illustration, the strips 60 may comprise a reflective ink or printed line of suitable color and thickness.

Figure 9:
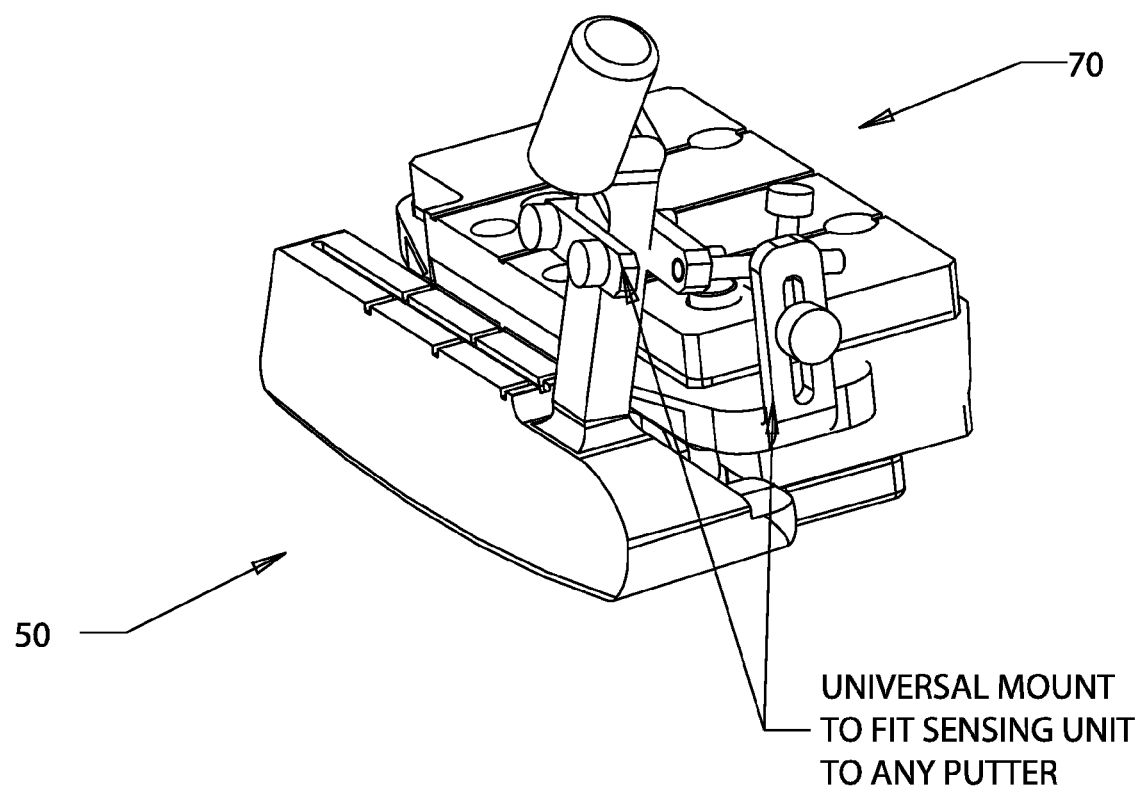
FIG. 9 is a perspective view of a putter head with an attached alignment sensor.

With reference to FIG. 9, the putter head 50 is provided with an alignment sensor or sensor unit 70 including sensors that detect whether the putter head is in alignment with the sensor strips 60. Preferably, there are two sensor strips 60 provided or displayed on the bottom wall of the grid box 28, 128. The alignment sensor 70 includes two optical sensors 140 that detect the position of the putter head 50 relative to the sensor strips 60. The alignment sensor 70 is provided with a signal source that emits a separate signal for each of the two optical sensors 140 relative to the sensor strips 60. The optical sensors 140 on the bottom of the sensor unit 70 read the sensor strips 60. One sensor follows each sensor strip, which makes it possible to determine if the golf club is rotating or going off path during the putting stroke. This is a live and continuous feedback that is continuous during the entire putting stroke. The golfer can use the alignment sensor 70 in combination with strips 60 on the inserts 126, 127 with or without the grid box 28, 128.

Figure 10:
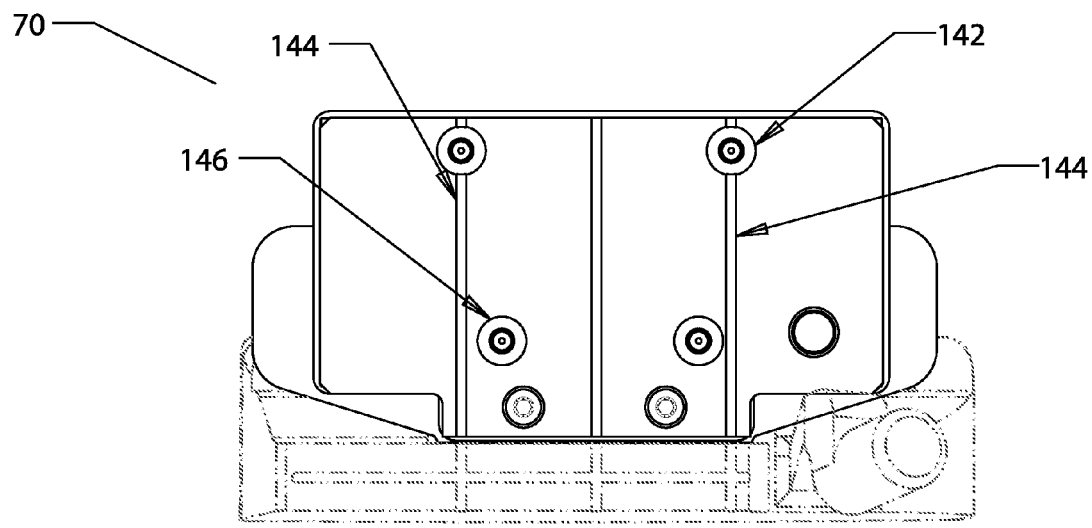
FIG. 10 is a top view of the alignment sensor.
Figure 11:
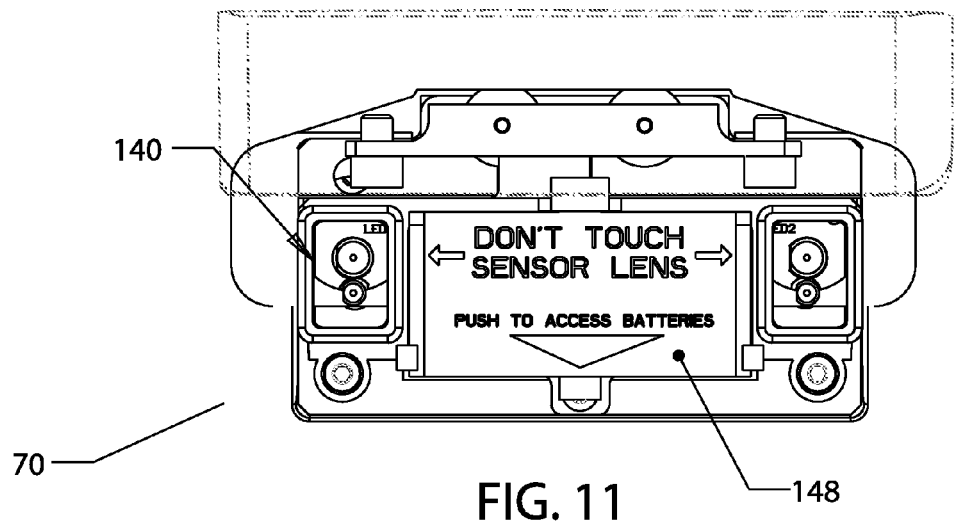
FIG. 11 is a bottom view of the alignment sensor.

Details of an exemplary sensor unit 70 are shown in FIGS. 10-14. FIG. 10 is a top view of the sensor unit 70, and FIG. 11 is a bottom view of the sensor unit 70. The top view is facing the golfer during use. In a preferred embodiment, the sensor unit is provided with two green or white LEDs 142 in line with corresponding putter aiming lines 144 on the sensor unit. Two red LEDs 146 warn the golfer that the putter head is off line from the sensor strips 60. In the bottom view, the sensor unit 70 includes infrared/optical sensors 140 sealed in a rubber cap that interact with the sensor strips. A battery door 148 is provided for battery replacement.

Figure 12:
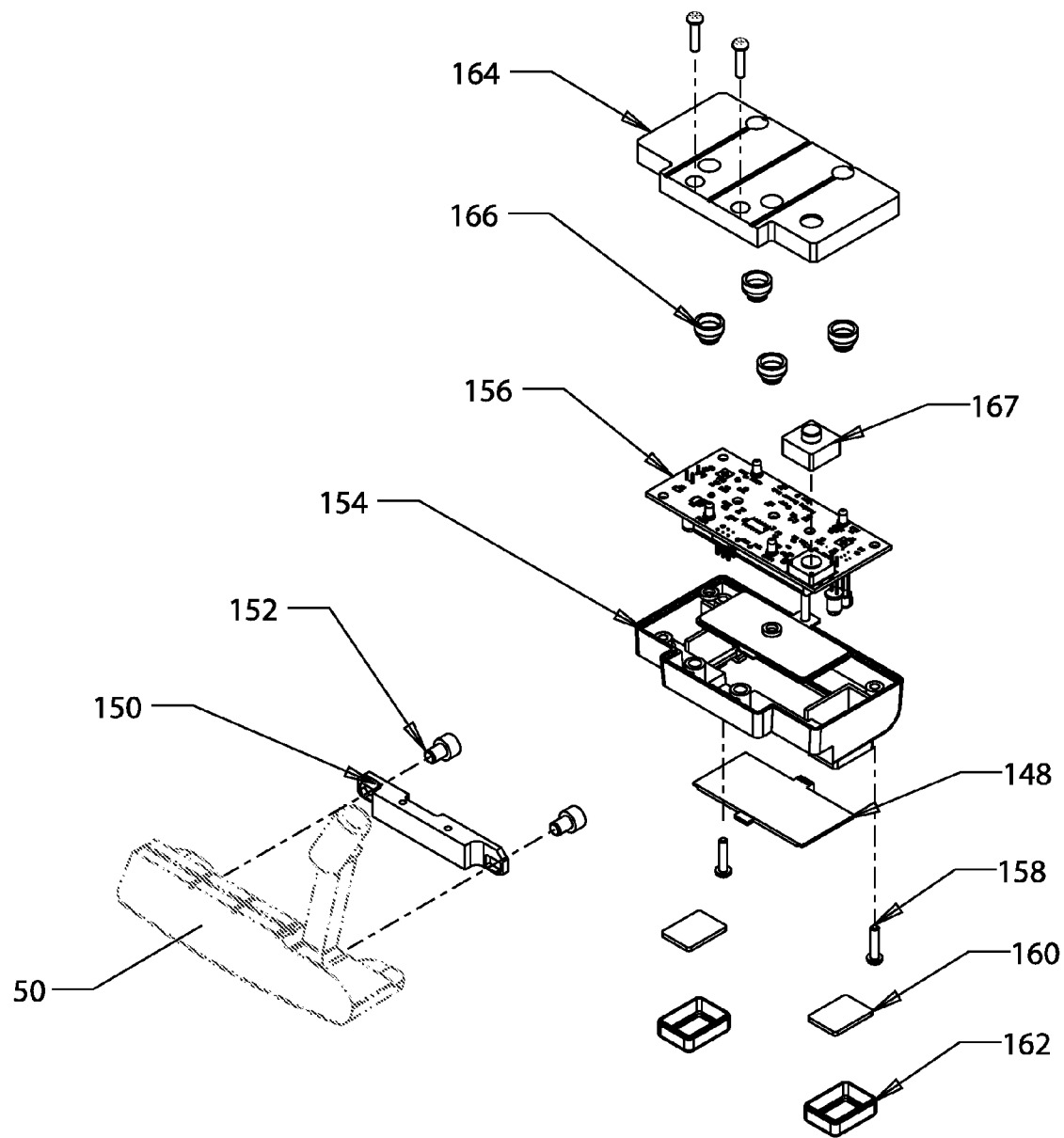
FIG. 12 is an exploded view of the alignment sensor.

FIG. 12 is an exploded view of the sensor unit 70. The sensor unit 70 is coupled with a bracket 150 that mounts the sensor unit to the putter head 50 via screws 152. A bottom housing 154 contains a printed circuit board (PCB) 156 that provides the electronics for achieving the desired functionality. The battery door 148 is secured via screws 158 to the bottom housing, and a clear polycarbonate lens 160 is secured over the optical sensors 140 and sealed via a rubber cap 162. A top housing 164 secures reflector cones 166 to intensify the LEDs 142, 146 and enclose the PCB 156 in the bottom housing 154. A rubber button 167 coupled with the PCB 156 extends to an exterior of the top housing 164 through an opening in the top housing 164 for turning the unit on and off and for keeping moisture out.

Figure 13:
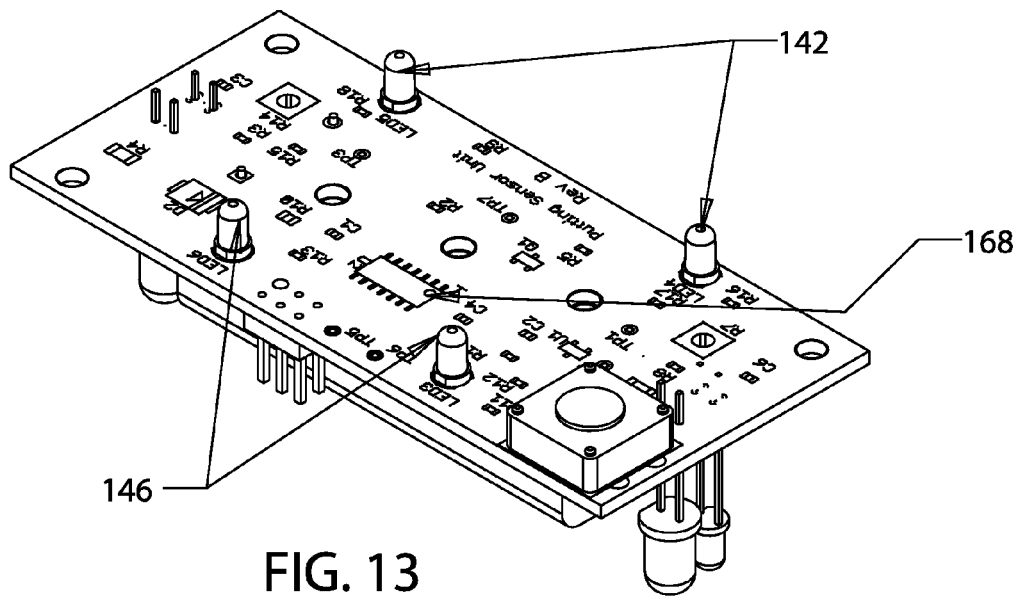
FIGS. 13 and 14 show details of the PCB.
Figure 14:
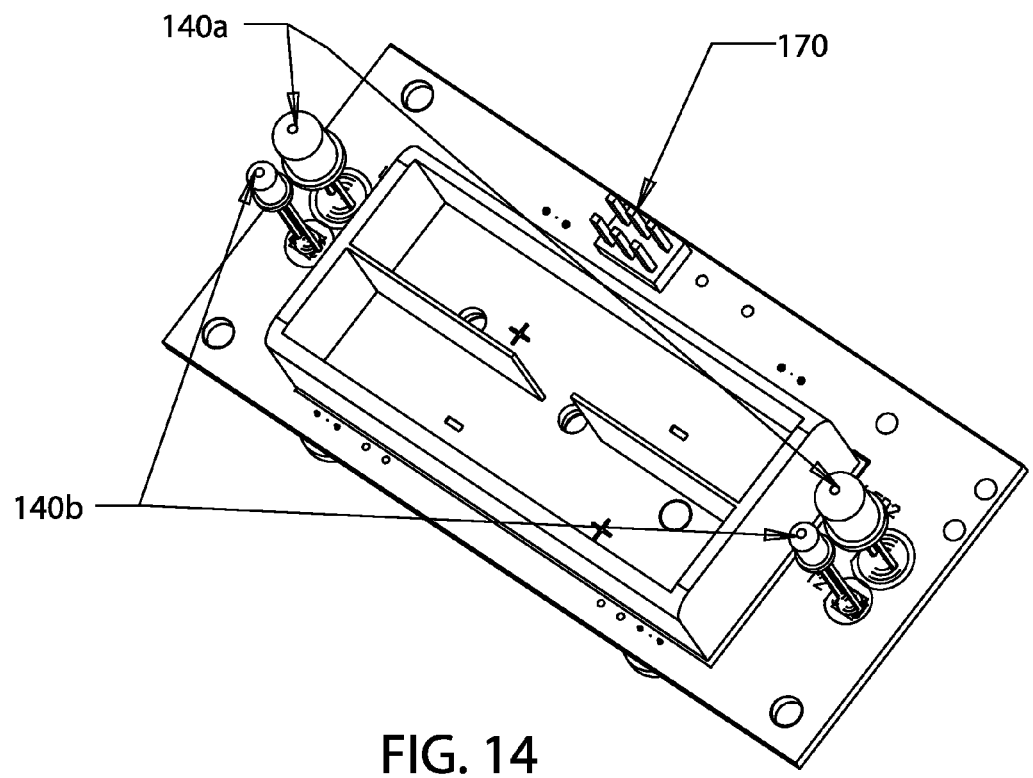

FIGS. 13 and 14 show exemplary details of the PCB 156. The PCB 156 supports the optical sensors 140 each including an infrared transmitter 140*a* and an infrared receiver 140*b* and a microprocessor 168 that activates the LEDs 142, 146 on an opposite side of the PCB 156 according to signals from the optical sensors 140. The PCB 156 also includes a standard interface connection 170 that can be used for modifying programming and for retrieving velocity and positioning information stored in a memory.

The alignment sensor 70 may alternatively or additionally include an audible indicator (e.g., alarm, buzzer) or physical indicator (e.g., vibration) that is activated with the putter head is off line. The sound(s) and or vibration(s) can be amplified as the putter head is farther off line.

In use, it is desirable for the sensor strips 60 to be followed during putting. In order to follow the preferred putting stroke, both green or white diodes 142 must be on. If one of the red diodes 146 is illuminated, the club is twisted. If both red diodes 146 are illuminated, the golfer has gone off track. As the ball is struck, both green or white diode lights 142 should be illuminated in order to send the ball in the direction the grid box 28, 128 has been aimed; i.e., having a square face to the ball relative to the target. This feature provides an additional indicator to the golfer to assist the golfer in aligning the putter head in a proper orientation, particularly at impact.

With reference to FIG. 8, the sensor strips 60 typically may be curved to accommodate a more pendulum-type swing. The curvature is predetermined based on the preferred putting stroke path of the particular user. A template can be generated so that the strips can be properly placed. As noted above, it is not necessary that the putter head maintain alignment during the entire putting stroke, but rather the putter head should be aligned at impact. In still another variation, the sensor strips 60 may be wider to accommodate a non-linear putting stroke. In this context, the sensor strips may be tapered such that the strips are narrowest at the impact position and wider through the back swing and follow-through of the putting stroke also to accommodate a pendulum or other non-linear putting stroke.

The sensor strips 60 do not affect the recording of the putting stroke on the computers.

During the early phases of practice putting, the movable wall 136 supporting the toe of the golf club will aid the golfer in his muscle memory to obtain the feeling of what an accurate stroke should be. Proficiently repeated successful putts, utilizing the support of the adjustable/movable wall 136, lends confidence to the putting stroke for following the preferred putting path. After repeated successful putts, the movable wall 136 supporting the toe of the club can be readjusted back to the fixed rigid wall 134 of the grid box 28, 128. Undoubtedly, at this point, errors in the putting stroke may appear. Repeated efforts to follow the preferred putting path in conjunction with the lines on top of the putter and sensor unit will eventually develop the golfer skill to produce a consistent putting stroke.

The weight of the putter head 50 can be adjusted using suitably drilled holes and specifically weighted lead inserts. It is desirable to avoid weight fluctuations with the sensor unit or scriber attachment attached to the putter head. When the training components are removed, the lead inserts can be added so that the putter head weight is consistent from initial testing and analysis through actual use during play. An exemplary target weight for the putter head is 350 grams.

The training system and described process eliminate the randomness of repeated putting that has successes and failures but have no benchmarks as to where the errors are being created. The grid box can be taken to any position on any green and eventually be very helpful in selecting various aiming directions for breaking putts. The golfer can repeatedly make a judgment call as to what the proper break should be. Because of the aiming protractor on the grid box, the golfer is able to measure down to a small dimension (e.g., $1/16^{th}$ of an inch) as to the modification required to change the aim in order to have a successful putt. This can only be done by repeatedly studying the contour of the green and making adjustments in the aim of the grid box. When it is concluded how much aim is incorrect, the golfer can eventually improve stability for making judgment calls to make the first putt successful. Repeatedly visualizing where misjudgments can be made will eventually teach the mind's eye to solve the mysteries hidden in the contours around the golf cup.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A putting stroke training system comprising:
    a putting surface including a stroke recording section and a result section, the stroke recording section recording stroke paths of a putter head, and the result section recording a result of each stroke of the putter head and identifying successful strokes;
    a stroke analysis tool cooperable with the putting surface that correlates successful strokes with respective ones of the stroke paths recorded by the stroke recording section, the stroke analysis tool generating a preferred stroke path based on the respective ones of the stroke paths correlated with the successful strokes; and
    an alignment tool including a putting guide that graphically illustrates the preferred stroke, the alignment tool comprising a fixed side wall and a movable side wall, wherein the movable side wall is positionable relative to the fixed side wall into alignment with the preferred stroke.

2. A putting stroke training system according to claim 1, wherein the preferred stroke path includes a backswing path and a follow-through path, and wherein the movable side wall is positionable into alignment with the backswing path of the preferred stroke.

3. A putting stroke training system according to claim 1, wherein the putting surface is a bottom wall of the alignment tool.

4. A putting stroke training system according to claim 1, wherein the putting surface is a putting board.

5. A putting stroke training system according to claim 1, wherein the movable side wall is formed of a flexible material and is connected to the fixed side wall with a plurality of set screws, the set screws being adjustable to position the movable side wall into alignment with the preferred stroke.

6. A putting stroke training system according to claim 1, further comprising an alignment sensor attachable to a putter head.

7. A putting stroke training system according to claim 6, wherein the putting guide comprises a line representative of the preferred stroke, and wherein the alignment sensor detects a position of the putter head relative to the line.

8. A putting stroke training system according to claim 7, wherein the alignment sensor comprises a signal source that emits a signal depending on the position of the putter head relative to the line.

9. A putting stroke training system according to claim 8, wherein the alignment sensor comprises two guide points or lines on a visible surface, wherein the putting guide comprises two lines representative of the preferred stroke, the two lines being spaced apart by a distance that equals a distance between the two guide points or lines on the visible surface of the alignment sensor.

10. A putting stroke training system according to claim 9, wherein the alignment sensor comprises two optical sensors that detect the position of the putter head relative to the two lines of the putting guide, and wherein the signal source of the alignment sensor emits a separate signal for each of the two optical sensors relative to the two lines of the putting guide.

11. A putting stroke training system according to claim 1, wherein the stroke analysis tool generates the preferred stroke path based on an average of a plurality of the stroke paths correlated with the successful strokes.

12. A putting stroke training system according to claim 1, wherein the stroke recording section comprises an electronic recording screen having one of a touch sensitive or light sensitive surface, the electronic recording screen being coupled with a memory that stores the putter head stroke paths based on signals from the electronic recording screen.

13. A putting stroke training system according to claim 12, wherein the stroke analysis tool comprises a computer processor communicating with the electronic recording screen and the result section, the computer processor selectively displaying the preferred stroke on the electronic recording screen.

14. A putting stroke training system for training a golfer to putt along a preferred putting stroke, the training system comprising:
   a grid box including a fixed side wall and a movable side wall, wherein the movable side wall is positionable relative to the fixed side wall into alignment with the preferred putting stroke; and
   an alignment sensor attachable to a putter head,
   wherein the grid box includes a bottom wall having a graphical illustration of the preferred putting stroke, and wherein the graphical illustration is provided by reflective tape on the bottom wall, the alignment sensor including a reflective sensor that detects a position of the putter head relative to the preferred putting stroke, and a signal source that emits a signal depending on the position of the putter head relative to the preferred putting stroke,
   wherein the alignment sensor comprises two guide points or lines on a visible surface, and wherein the graphical illustration comprises two lines representative of the preferred putting stroke, the two lines being spaced apart by a distance that equals a distance between the two guide points or lines on the visible surface of the alignment sensor, wherein the alignment sensor comprises two optical sensors that detect the position of the putter head relative to the two lines of the putting guide, and wherein the signal source of the alignment sensor emits a separate signal for each of the two optical sensors relative to the two lines of the putting guide.

* * * * *